(12) United States Patent
Nafie

(10) Patent No.: US 6,480,277 B1
(45) Date of Patent: Nov. 12, 2002

(54) DUAL CIRCULAR POLARIZATION MODULATION SPECTROMETER

(75) Inventor: Laurence A. Nafie, Syracuse, NY (US)

(73) Assignee: BioTools, Inc, Lake Zurich, IL (US)

( * ) Notice: Subject to any disclaimer, the term of this patent is extended or adjusted under 35 U.S.C. 154(b) by 0 days.

(21) Appl. No.: 09/981,442

(22) Filed: Oct. 18, 2001

(51) Int. Cl.$^7$ ................................. G01J 4/00
(52) U.S. Cl. ............ 356/364; 356/367; 356/368; 356/365; 356/366; 250/339.08
(58) Field of Search ................. 256/364, 365, 256/366, 367, 368, 369, 450, 451, 453, 454; 250/339.07, 339.08, 339.09, 341.3

(56) References Cited

U.S. PATENT DOCUMENTS

| | | | | |
|---|---|---|---|---|
| 4,306,809 A | * | 12/1981 | Azzam | 356/368 |
| 4,480,916 A | * | 11/1984 | Bareket et al. | 356/450 |
| 4,884,886 A | | 12/1989 | Salzman | 356/367 |
| 4,953,980 A | | 9/1990 | DeVolk | 356/338 |
| 5,045,701 A | * | 9/1991 | Goldstein et al. | 250/339 |
| 5,247,176 A | * | 9/1993 | Goldstein | 356/368 |
| 5,311,284 A | | 5/1994 | Nishino | 356/364 |
| 5,532,488 A | * | 7/1996 | Ishibashi et al. | 250/341.3 |
| 5,788,632 A | | 8/1998 | Pezzaniti | 600/316 |
| 5,920,393 A | | 7/1999 | Kaplan | 356/364 |
| 6,025,913 A | * | 2/2000 | Curbelo | 356/450 |

* cited by examiner

Primary Examiner—Frank G. Font
Assistant Examiner—Sang H. Nguyen
(74) Attorney, Agent, or Firm—Douglas F. Kimball

(57) ABSTRACT

A circular dichroism spectrometer eliminates linear birefringent interference by having a first polarization modulator before the sample and a second polarzation modulator after the sample. The two polarization modulators vibrate at different frequencies so the signals can be distinguished and manipulated. The addition of the second polarization modulator, an additional lock in amplifier, and software to manipulate the two signals corresponding to the two vibrational frequencies allow a real time circular dichroism spectra free from interference to be determined.

16 Claims, 5 Drawing Sheets

DUAL CIRCULAR POLARIZATION MODULATION SPECTROMETER

BACKGROUND

1. Field of Invention

The present invention relates to the field of spectroscopy and spectrophotometers. Specifically the invention relates to the field of ultraviolet, visible, and infrared spectroscopy. More specifically the invention relates to the field of circular polarized light spectroscopy. The invention is a new spectrometer that uses circular polarized light to generate a circular dichroism spectrum free from interference.

2. Description of Related Art

Spectroscopy is the science and application of light measurement. A spectrometer or spectrophotometer is the instrument that is used to measure the spectrum of a substance. A spectrometer has a light source, a light selection device, a sample compartment, and a light detector along with appropriate electronic and computer controls and data acquisition capabilities. Common scientific spectrometers have a light source that can generate light in the ultraviolet (UV), visible, and infrared (IR) regions. A common UV light source is the hydrogen or deuterium lamp. A visible light source is usually a tungsten lamp. An IR source is commonly a special ceramic material that is heated to a given temperature.

A light selection device is usually an arrangement of slits, filters, and diffraction gratings and other elements that allow the selection of light with particular characteristics to proceed through the optical configuration. The characteristics selected for could be the wavelength or the polarization or both. The wavelength selection device can select a very narrow range of wavelengths from the incoming polychromatic light. If the wavelength selection device is good enough, the light coming from the device is virtually monochromatic light. This type of wavelength selection characterizes the dispersive spectrometer.

An alternate configuration for a wavelength selection device, termed Fourier-transform spectrometer, makes use of the Michelson interferometer and computer manipulations of the resulting signal to generate an absorption spectrum. A beam splitter splits the beam from the light source. One of the two resulting beams of light is reflected from a fixed mirror back to the beam splitter and the second beam of light is reflected from a movable mirror back to the beam splitter. The beam splitter recombines the light from the two reflective mirrors to form a single beam that goes through the rest of the components of the spectrometer. Because the two light paths are identical only at one instance in time, an interference pattern versus time is generated. Computer manipulations of the resulting signal from the interference pattern result in an absorption spectrum This Fourier-transform spectrophotometer has become the instrument of choice in many situations because higher light levels are transmitted through the instrument which gives a better signal to noise ratio in the resulting spectrum.

The particular light selected is used to probe the sample, which can be liquid, solid, or gas, and is detected at a light detector that is usually a photomultiplier or photodiode with appropriate electronic amplification and recording devices. Another light modifying element of a light selection device is a polarization modulator (PM). A PM has the ability to take linear polarized light and modulate it at a fixed modulation frequency between right circular polarized (RCP) and left circular polarized (LCP) light. A PM has an optical element, such as fused silica, and an attached transducer for vibrating the optical element at a particular frequency as described in U.S. Pat. No. 5,652,673. As the optical element vibrates under the influence of the transducer, the optical element is compressed and extended in an oscillating fashion. The effect of this oscillation in the optical element is to cause the light that leaves the element to be modulated between LCP and RCP. When a beam of incident radiation modulated between RCP and LCP is used to probe a sample, the sample may absorb selectively the RCP or the LCP light. If the wavelength of the incident light is controlled so that the entire spectrum of interest can be sampled as a probe, the light hitting the light detector will be a function of the difference in the ability of the sample to absorb LCP and RCP light at the various wavelengths that are selected. When the signal from the light detector is demodulated at the same frequency that the PM is operating, a spectral scan can be obtained that shows the difference between the LCP and the RCP light absorbed by the sample as a function of the wavelength of the incident circular polarized beam of light This differential spectral scan is called the circular dichroism (CD) spectrum of the sample. The CD spectrum of a material can be used to probe the chiral properties of a material, and, thus, it is very important in the understanding of the absolute molecular configuration of chemical compounds.

A carbon atom can have four different atoms or groups of atoms covalently attached to it. The attached groups form a tetrahedron that, if the groups are not identical, can have either an R or an S configuration. This asymmetrical configuration in the molecular structure of the compound gives rise to the differential absorption of the LCP and the RCP light. If equal concentrations of the R configuration and the S configuration are present, the sample is termed a racemic mixture of the two configurations. Because the equal concentrations of R and S configurations will absorb the RCP and LCP light equally, there will be no CD spectrum of the sample. If only a single configuration of a molecule is present in the sample, the sample will give a CD spectrum. If, for example, the R configuration is present as 75% of the sample and the S configuration is present as 25% of the sample, the CD spectrum will have the pattern of the R configuration but will not have the full intensity of a sample of the pure R configuration of the molecule. In this manner the chiral purity of a sample can be determined. In certain drugs, only one of the two possible configurations gives the desired effect. If the CD spectrum of a chemical compound can be accurately determined it can be compared to theoretical calculations to test the accuracy of the theoretical understanding of the chemical compound.

The optical configuration of a spectrometer described above, and shown in FIG. 1, can be represented by the following symbol pattern:

$$LS \rightarrow G \rightarrow P \rightarrow PM \rightarrow S \rightarrow D \qquad (I)$$

where LS is the light source 2; G is a wavelength selection device or Michelson interferometer 4; P is a linear polarizer 6, needed to define a single state of polarization such as vertical polarized light; PM is a polarization modulator 8 with stress axis at 45° from the axis of the linear polarizer, which switches the polarization between LCP and RCP states; S is the sample 10 and D is the detector 12. An example of a G is the Fourier transform infrared interferometer sold by Bomem of Quebec, Canada. An example of a P is an aluminum wire-grid infrared polarizer from Specac Inc., Smyrna, Ga. An example of a D is a mercury cadmium telluride detector from EG&G Optoelectronics in Santa Clara, Calif. An example of a PM is the photoelastic modulator sold by Hinds Instruments in Hillsboro, Oreg. In practice the PM switches between LCP and RCP at a rate of between 20 and 100 kilohertz.

The intensity of the light that strikes the detector can be represented by equation number 1.

$$I_D = TR + CD \tag{1}$$

where $I_D$ 14 is the intensity at the detector and TR 20 is the ordinary transmitted radiation spectrum of the sample with an absorbance, A. TR is the amount of light that passes through the sample and reaches the light detector. A sample will absorb some of the light at any particular wavelength of light, and that is termed the absorbance of the sample. The absorbance, A, is defined as the negative logarithm of the base 10 of the ratio of the intensity at the detector when the sample is in place, TR, divided by the same intensity when the sample has been removed, $TR_0$. This is given by $$A = -log_{10}(TR/TR_0) \tag{2}$$

The absorbance of a sample will vary as a function of the wavelength and concentration of the absorbing compound in the sample compartment. The light that is not absorbed by the sample is the light that is transmitted through the sample and is termed the transmission spectrum of the sample.

The CD term 18 of the equation (1) is that part of the detector signal, $I_D$ 14, that oscillates at the PM modulation frequency. At any given wavelength, the CD term could add to, subtract from, or not affect the TR term 20 of equation (1). The CD term, which is obtainable only at the PM modulation frequency, can be considered a change in absorbance of the sample at the PM modulation frequency. The CD term is the difference between amount of LCP light absorbed by the sample and the amount of RCP light absorbed by the sample. Thus if more LCP light is absorbed, the CD term will be positive and if more RCP light is absorbed, the CD term will be negative. The TR term is very large compared to the CD term in equation (1). Typically for determinations of the CD spectra in the infrared region of the spectrum, the TR term is ten thousand to one hundred thousand as strong as the CD signal. However, the CD term can be observed in practice because the signal from the detector that oscillates in frequency with the PM frequency can be isolated from the rest of the signal by a lock-in amplifier, LIA 16. An example of a LIA is the Model SR810 lock-in amplifier from Stanford Research Systems, Sunnyvale, Calif.

The measured circular dichroism spectrum, ΔA 24 is defined as the absorbance for LCP light, $A_L$, minus the absorbance for RCP light, $A_R$, as $$\Delta A = A_L - A_R \tag{3}$$

To obtain the circular dichroism spectrum, ΔA 24 the CD term 18 is divided by the TR term 20 by means of a software operation DIV 22, and then multiplied by a software calibration factor, CAL, as $$\Delta A = CAL(CD/TR) \tag{4}$$

In an optical configuration as shown in I, an unwanted background spectrum occurs and is given the technical term linear birefringence (LB). This is an unwanted background (UB) that disturbs the zero base line upon which the desired CD spectrum appears. LB can be represented as a part of an optical configuration and as shown in FIG. 2 as an optical-electronic diagram:

$$LS \to G \to P_1 \to PM \to LB \to P_2 \to D \tag{IIa}$$

or $$LS \to G \to P_1 \to LB \to PM \to P_2 \to D \tag{IIb}$$

where LB is the source of the linear birefringence 26 with axes parallel or perpendicular to those of the PM. The LB may be present as a birefringent plate, strain in the sample windows, or strain in the PM. In practice, the precise cause of LB is very difficult to define. A second polarizer, $P_2$ 28, parallel, perpendicular or some angle between, to the first polarizer, $P_1$ 6, has been added to the optical configuration prior to the detector. The second polarizer may be a linear polarizer inserted into the configuration intentionally or the linear polarization intensity of the detector itself. Thus the LB cannot be eliminated from the system. The mathematical expression for the intensity of the radiation at the detector, $I_D$ 30, is given by equation (5):

$$I_D = TR' + UB \tag{5}$$

where the TR' term 34 is closely related to the TR term 20 in equation (1), and the UB term 32 is the signal that represents an unwanted background due to the linear bireflingence in the optical path between the two polarizers, $P_1$ 6 and $P_2$ 28. The final circular dichroism spectrum due to the unwanted background in the optical path is given by $\Delta A_B$ 36, $$\Delta A_B = CAL(UB/TR') \tag{6}$$

where the UB signal is divided by the TR' and then calibrated as in equation (4).

An alternative optical configuration for a CD spectrophotometer interchanges the position of the sample S 10 and the polarization modulator PM 8 from configuration I FIG. 2. The addition of $P_2$ 28 to the configuration gives configuration III, as shown below and as illustrated in the optical-electronic diagram in FIG. 3, $$LS \to G \to P_1 S \to PM \to P_2 \to D \tag{III}$$

The mathematical expression for the intensity of the light hitting the detector $I_D$ 38 for configuration m is given by the equation $$I_D = TR' - CD/2. \tag{7}$$

Here, the TR' term 42 is similar to the term in equation (5) because the presence of $P_2$ 28 in the optical configuration, and the CD term 40 has the opposite sign and one-half of its value in equation (1). The opposite sign of the CD term arises because the PM is positioned after the sample instead of before the sample. The final circular dichroism spectrum 44 is obtained by division of $-CD/2$ by TR' followed by calibration as $$-\Delta A/2 = CAL((-CD/2)/TR') \tag{8}$$

All of the above information is well known in the prior art, and CD spectrophotometers have been manufactured using the above configurations. Spectrometers made by Jasco, Aviv, and Olis are available that obtain CD spectrum in the ultraviolet and visible region. Bomem/BioTools manufactures instruments that can obtain a CD spectrum in the infrared region.

BRIEF SUMMARY OF THE INVENTION

Current CD spectroscopy is faced with separating the UB contribution to the spectrum from the desired CD part of the spectrum. This is currently done by collecting the spectrum with and without the sample in place, storing the spectra in a digital format, and mathematically subtracting two spectra. Although informative, the operation cannot be ideal because introduction of the sample into the optical beam creates new UB functions. The current invention eliminates UB without any subsequent optical measurement or stored blank spectrum, and thus obtains for the first time a CD signal in real time that is free of UB interference.

The introduction of a second PM into the optical configuration eliminates the UB from the CD spectrum of a sample. The pure CD spectrum produced by the current invention gives a heretofore unobtainable precise and accurate CD spectrum of a sample in a single measurement. The improved CD spectrum of a sample can be used to investigate basic scientific questions about the sample such as absolute configuration, optical purity, and structural conformation.

DETAILED DESCRIPTION OF THE INVENTION

Figure 1:
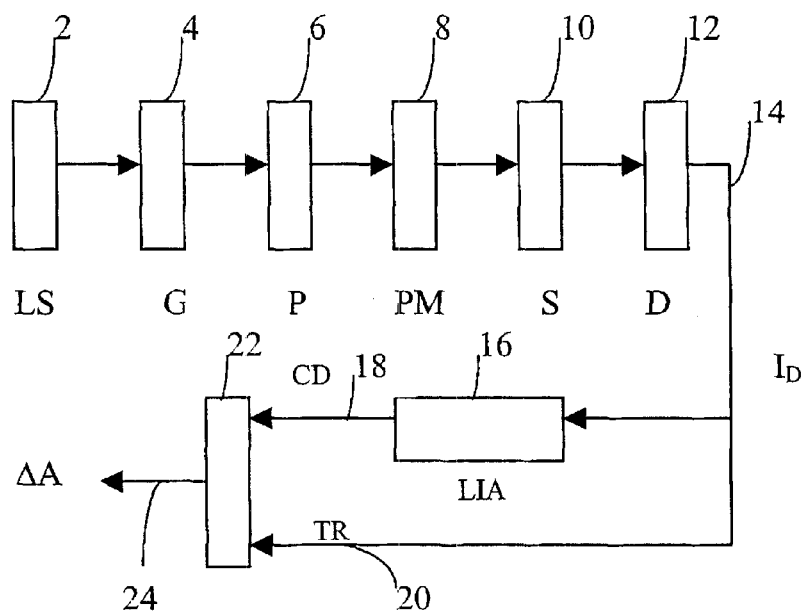
FIG. 1. Optical-electronic diagram of a typical CD spectrometer with a sample in place showing the detector pathways for the CD and TR intensities.
Figure 2:
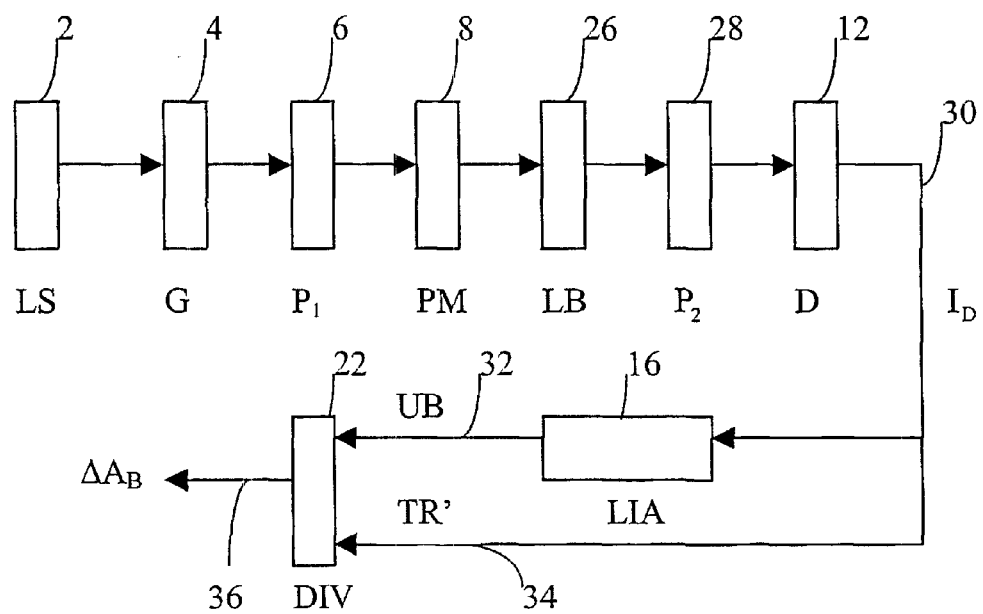
FIG. 2. Optical-electronic diagram of a typical CD spectrometer illustrating the source of linear birefringence and the CD background signal that it produces.
Figure 3:
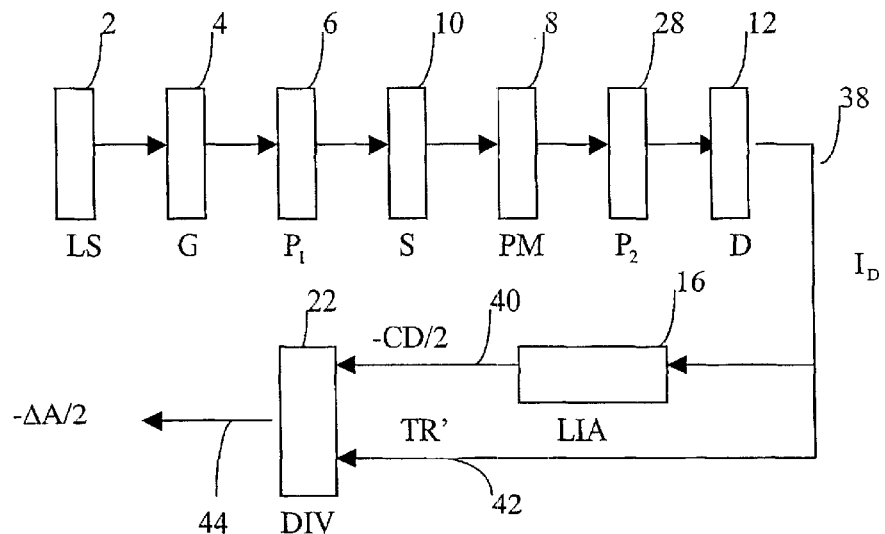
FIG 3. Optical-electronic diagram of a CD spectrometer with the sample located before the polarization modulator and the required second polarizer.
Figure 4:
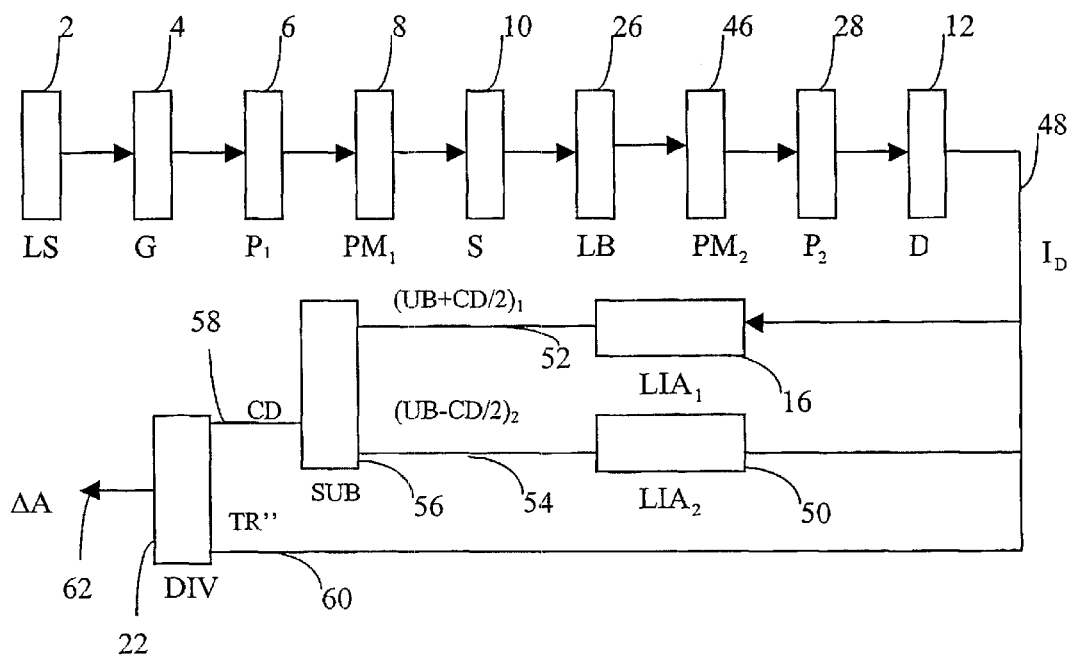
FIG. 4. Optical-electronic diagram of a dual polarization modulation CD spectrometer with a second polarizer and illustrating the two electronic pathways for the two CD modulation signals.

An optical configuration with two PM elements can be configured as shown in configuration IV and the optical-electronic diagram in FIG. 4.

$$LS \to G \to P_1 \to PM_1 \to S \to LB \to PM_2 \to P_2 \to D \quad (IV)$$

Configuration IV has a $PM_1$ 8 before the sample 10, LB 26 between the two polarizers, and a $PM_2$ 46 after the LB and sample. Although the LB is indicated after the sample it could arise from any place along the optical configuration as long as it is between the two polarizers. This dual polarization modulator spectrophotometer has the unique ability to eliminate the UB from the final circular dichroism spectrum. Such a spectrum that is free from UB allows precise and accurate measurement of the CD of the sample.

The expression for the signal at the detector $I_D$ 48 for optical configuration IV is $$I_D = TR'' + (UB + CD/2)_1 + (UB - CD/2)_2 \quad (9)$$

where the TR" term 60 is slightly modified from equations (1), (5), or (7) because the second PM is in the optical configuration. The two terms in the first parenthetical term 52 represent that part of the detector signal varying at the $PM_1$ frequency. It contains the unwanted background spectrum UB, and one half of the CD spectrum. The two terms in the second parenthetical term 54 are from that part of the detector signal that oscillates at the $PM_2$ frequency. If the two modulators are set at the same strength of polarization modulation (not the same frequency), the two UB and CD terms in equation (9) have the same UB and CD values independent of sign. It is sometimes technically difficult to set the strengths of the two PMs to be the same because they are in different optical environments. However, if one can identify a large UB signal, the PMs can be tuned until that UB signal vanishes. Current experiments with the system indicate that the frequencies of the two PMs need to be between 20 and 200 Hertz apart to achieve satisfactory signal definition. Since the two terms in the parenthesis of equation (9) are measured by separate lock-in in amplifiers, $LIA_1$ 16 and $LIA_2$ 50 tuned to $PM_1$ and $PM_2$ frequencies, these two contributions can be combined electronically by SUB 56. Electronic manipulation of the two signals from the lock-in amplifiers allows the signals from the two lock-in amplifiers to be either subtracted or added. An example of an electronic manipulator SUB is the Dual Channel Programmable Filter, Model SR650 by Stanford Research Systems in Sunnyvale, Calif. If the signal at the $PM_2$ frequency 54 is subtracted from the signal of the first lock-in amplifier 52 the UB terms cancel and the CD terms reinforce one another and become a total contribution twice the size of the contribution at each PM frequency. With these conditions in place, the expression for equation (9) can be rewritten $$I_D = TR'' + CD \quad (10)$$

Even though LB is present in the optical configuration IV, LB's contribution to the detector signal is zero leaving only a single CD term 58. Because LB is the primary source of optical artifacts in the measurement of a CD spectrum, this optical configuration and electronic analysis eliminates all LB artifacts and allows the direct measurement of the CD of the sample. This removes the need to measure a separate reference baseline at a different period in time using the opposite enantiomer, the racemic mixture, or even less accurately the solvent or the empty cell. The final circular dichroism spectrum, $\Delta A$ 62 is obtained by division and calibration from $$\Delta A = CAL(CD/TR'') \quad (11)$$

It is obvious by inspection of equation (9) that adding the signal of the second lock-in amplifier to the signal of the first lock-in amplifier will result in a signal that has no contribution from the CD spectrum of the sample and only represents the LB portion of the optical system. Although not useful to probe the molecular structure of the sample, determining the spectrum of the LB of the system may be useful in other optical determinations.

Figure 5:
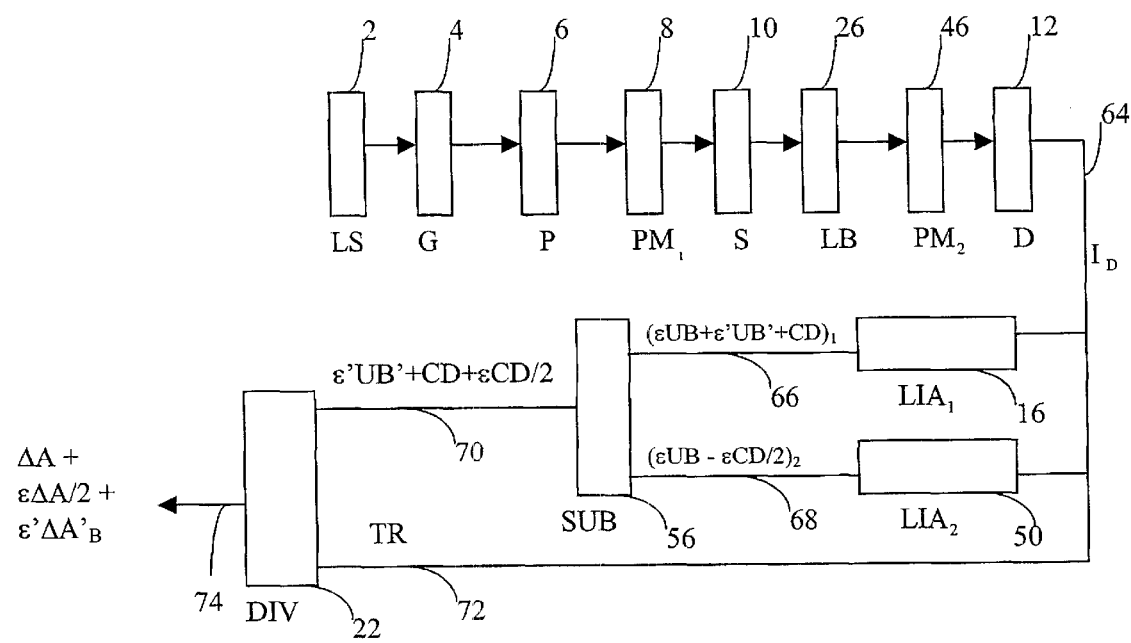
FIG. 5. Optical-electronic diagram of a dual polarization modulation CD spectrometer without a second polarizer illustration the two electronic pathways for the two CD modulation signals.

A variation on the best mode of the invention given above is the dual polarization modulator instrument in which the second polarizer $P_2$ 28 is removed. The optical configuration of this spectrometer is shown in configuration V and illustrated in the optical-electronic diagram in FIG. 5.

$$LS \to G \to P_1 \to PM_1 \to S \to LB \to PM_2 \to D \quad (V)$$

The mathematical expression for optical configuration V is:

$$I_D = TR + (\epsilon UB + \epsilon'UB' + CD)_1 + (\epsilon UB - \epsilon CD/2)_2 \quad (12)$$

All the terms containing $\epsilon$, the polarization sensitivity of the detector, are very small relative to the other terms of the equation. The first term in parenthesis 66 of equation (12) has a CD term that is twice as large as the CD term 52 in equation (9) because the second polarizer $P_2$ 28 has been removed from the optical configuration. If the two PMs are set to the same modulation strength (not the same frequency) and the signal from $PM_2$ 68 is subtracted (SUB 56) from the signal from $PM_1$ 66 equation (9) can be rewritten as sum of two terms, 72 and 70:

$$I_D = TR + CD + \epsilon CD/2 + \epsilon' UB' \quad (13)$$

The CD term in equation (13) is essentially the same as the CD term in equation (10) as long as the $\epsilon$ terms are close to zero. There remains in the equation a small UB' term that does not necessarily go to zero if the detector has a polarization sensitivity away from the pure vertical or horizontal planes. This UB' term would be at a maximum if the polarization sensitivity were at 45 degrees from the vertical or horizontal planes and approach zero as the polarization sensitivity approached the vertical or the horizontal plane. The potential disadvantage of using configuration (V) is that UB' may contribute to the signal and may not be completely eliminated. Nevertheless, if the polarization sensitivity of the detector is not at a disadvantageous angle, the method will be acceptable in practice. The final circular dichroism spectrum 74 is obtained by division (DIV 22) and calibration as $$\Delta A + \epsilon \Delta A/2 + \epsilon' \Delta A_B' = CAL((CD + \epsilon CD/2 + \epsilon' UB')/TR) \quad (14)$$

Another variation on optical configurations IV or V is the addition of multiple PMs at either the $PM_1$ or the $PM_2$ position. The addition of multiple PMs may require that each PM have its own selected frequency and lock-in amplifier to isolate its signal from the other PM signals. This optical configuration has a potential to reduce the magnitude of either the $\epsilon UB$ or the $\epsilon' UB'$ of equation (12) or equation (13), respectively. The multiple PMs must be set to a strength of polarization modulation and oriented to the incident polarized beam at either +45 or −45 degrees to reduce the magnitude of the $\epsilon UB$ term or at 0 or 90 degrees to reduce the magnitude of the $\epsilon' UB'$ term.

Figure 6:
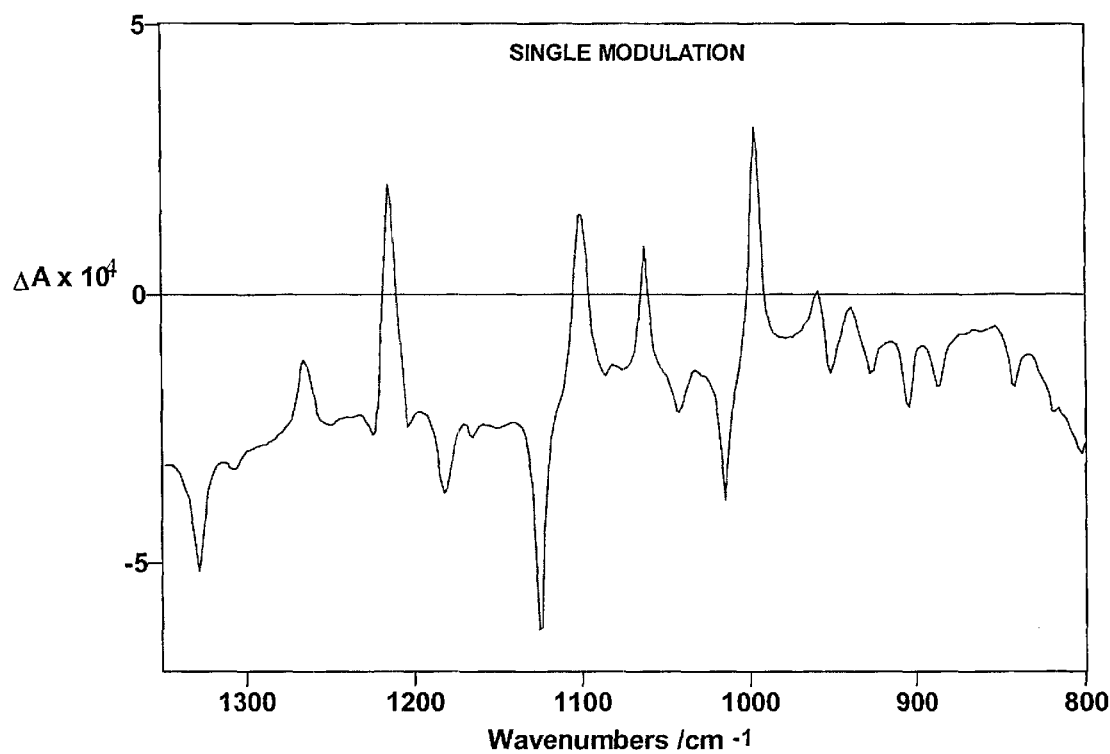
FIG. 6. Typical CD spectrum obtained from a CD spectrometer with only one modulator that includes an unwanted background spectrum due to linear birefringence.
Figure 7:
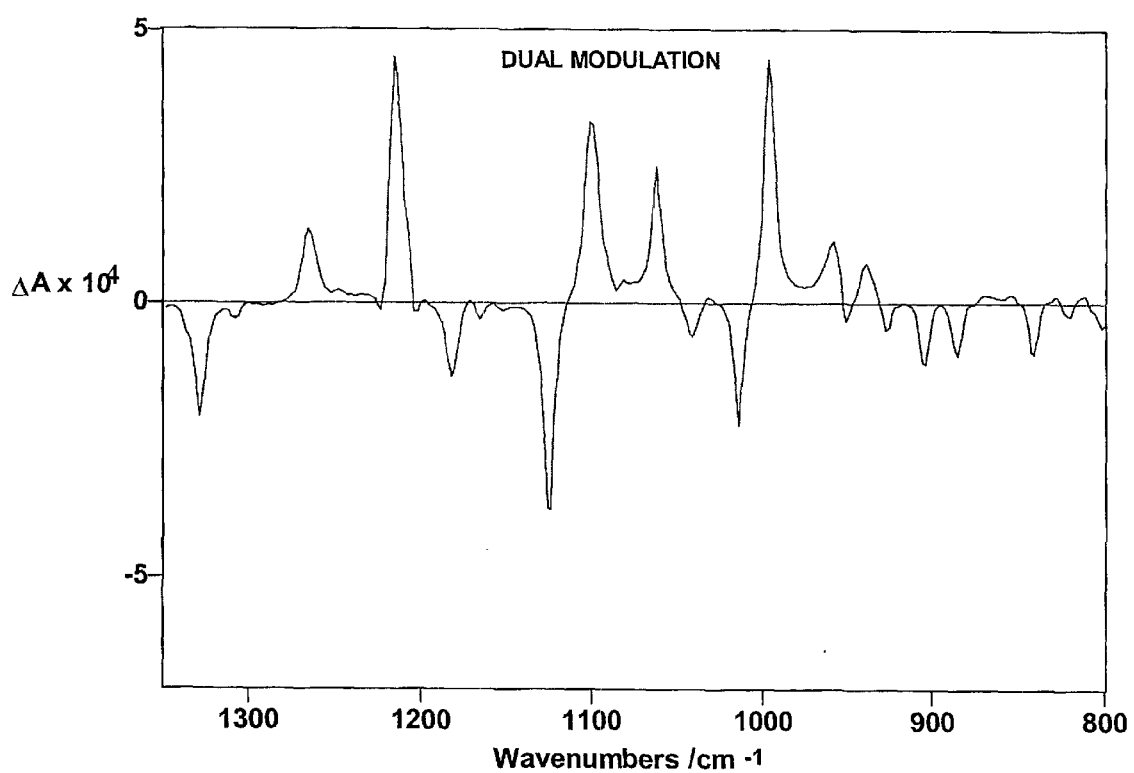
FIG. 7. The CD spectrum for the same sample as in FIG. 6 obtained with a dual modulation CD spectrometer where the unwanted background spectrum has been eliminated by the addition of the second modulator.

FIG. 6 shows the infrared circular dichroism spectrum, $\Delta A$, of an organic compound in which a single PM was operating. $\Delta A$ is a quantity of spectral intensity measurement that has no units. In this particular application the spectrum 76 is below the baseline and exhibits a slight upward slope as the spectrum is followed from high wavenumber frequency, given in units of $cm^{-1}$, to low wavenumber frequency. FIG. 7 shows the infrared CD spectrum 78 of the same sample as FIG. 6 but with the dual PM's operating. In FIG. 7 the spectrum is not displaced from the baseline and there is no slope to the baseline of the spectrum.

Any practitioner skilled in the optical arts can build an operating dual modulated circular dichroism spectrometer in a number of different detailed optical paths that follow the optical configuration given in configurations IV and V. The second PM could be added to existing circular dichroism spectrometers by appropriate modification of the light path. In addition, an existing absorption spectrometer could be modified by the addition of two polarization modulators, modifications in the light path if necessary, and addition of appropriate electronics to create a dual polarization modulation spectrometer.

What is claimed is:

1. A dual circular polarization modulator spectrometer comprising, in combination:
   a light source;
   a wavelength selection device;
   a first polarizer;
   a first polarization modulator vibrated to modulate incoming light between left and right circular polarized light at a selected frequency;
   a sample chamber;
   a second polarization modulator vibrated to modulate incoming light between left and right circular polarized light at a selected frequency that is not the same frequency as the selected frequency for the first polarization modulator whereby strength of the first a polarization modulator and strength of the second polarization modulator can be manipulated to eliminate unwanted background signal;
   second polarizer;
   a light detector;
   a first lock-in amplifier whereby a signal corresponding to the selected frequency of the first polarization modulator is isolated;
   a second lock-in amplifier whereby a signal corresponding to the selected frequency of the second polarization modulator is isolated;
   an electronic manipulator to combine the signals from the first and the second lock-in amplifiers whereby the signals can be combined by mathematical operations.

2. A dual circular polarization modulator spectrometer as claimed in claim 1 wherein the first and second polarization modulators operate at a frequency between about 20 and about 100 kilohertz.

3. A dual circular polarization modulator spectrometer as claimed in claim 1 wherein the first and the second polarization modulators operate at two different frequencies.

4. A spectrometer as claimed in claim 1 wherein the electronic manipulator combines the signals from the first and second lock-in amplifiers by subtracting the signal of one of the lock-in amplifiers from the signal of the other lock-in amplifier whereby the resulting spectra is a circular dichroism spectra of the sample free from linear birefringent interference.

5. A spectrometer as in claim 1 wherein the electronic manipulator combines the signals from the first and the second lock-in amplifiers by adding the signal of the two lock-in amplifiers whereby the resulting spectra is a linear birefringent spectra free from circular dichroism.

6. A dual circular polarization modulator spectrometer comprising, in combination:
   a light source;
   a wavelength selection device;
   a polarizer;
   a first polarization modulator vibrated to modulate the incoming light between left and right circular polarized light at a selected frequency;
   a sample chamber;
   a second polarization modulator vibrated to modulate the incoming light between left and right circular polarized light at a frequency that is not the same frequency as the selected frequency for the first polarization modulator whereby strength of the first polarization modulator and strength of the second polarization modulator can be manipulated to eliminate unwanted background signal;
   a light detector;
   a first lock-in amplifier whereby a signal corresponding to the selected frequency of the first polarization modulator is isolated;

a second lock-in amplifier whereby a signal corresponding to the selected frequency of the second polarization modulator is isolated;

an electronic manipulator to combine the signals from the first and the second lock-in amplifiers can be combined by mathematical operations.

7. A dual circular polarization modulator spectrometer as claimed in claim 6 wherein the first and second polarization modulators operate at a frequency between about 20 and about 100 kilohertz.

8. A dual circular polarization modulator spectrometer as claimed in claim 6 wherein the first and the second polarization modulators operate at two different frequencies.

9. A spectrometer as claimed in claim 6 wherein the electronic manipulator combines the signals from the first and second lock-in amplifiers by subtracting the signal of one of the lock-in amplifiers from the signal of the other lock-in amplifier whereby the resulting spectra is a circular dichroism spectra of the sample free from linear birefringent interference.

10. A spectrometer as in claim 6 wherein the electronic manipulator combines the signals from the first and the second lock-in amplifiers by adding the signal of the two lock-in amplifiers whereby the resulting spectra is a linear birefringent spectra free from circular dichroism.

11. A method for obtaining a circular dichroism spectra of a substance free of linear birefringence interference comprising:

adding a second polarization modulator to a circular dichroism spectrometer, said circular dichroism spectrometer having a light source, a wavelength selection device, a first linear polarizer, a first polarization modulator vibrated at a selected frequency, a sample chamber, a light detector, and a lock-in amplifier to detect the signal corresponding to the selected frequency of the first polarization modulator;

vibrating the second polarization modulator at a selected frequency that is not the same as the selected frequency of first polarization modulator, whereby the strength of the first polarization modulator and the strength of the second polarization modulator can be manipulated to eliminate unwanted background signal;

adding a second lock-in amplifier whereby the signal corresponding to the selected frequency of the second polarization modulator is isolated;

electronically manipulating the signals obtained from the first and the second lock-in amplifiers whereby the resulting signal is the circular dichroism spectra of the substance in the sample chamber free from linear birefringence interference.

12. A method for obtaining the circular dichroism spectra of a substance as in claim 11 in which an additional polarizer is added to the optical configuration.

13. A method for obtaining the circular dichroism spectra of a substance free of linear birefringence interference comprising:

adding a first and a second polarization modulator and a polarizer to an absorption spectrometer, said absorption spectrometer having a light source, a wavelength selection device, a sample chamber and a light detector;

vibrating the first polarization modulator at a selected frequency;

vibrating the second polarization modulator at a selected frequency that is not the same selected frequency at which the first polarization modulator vibrates;

selecting the strength of the modulation of the first and the second polarization modulators so that unwanted background signal will be eliminated;

locating the sample chamber between the first and the second polarization modulators;

adding a first lock-in amplifier and a second lock-in amplifier whereby a signal corresponding to the selected frequency of the first polarization modulator and a signal corresponding to the selected frequency of the second polarization modulator are obtained;

electronically manipulating the signal from the first lock-in amplifier and the signal from the second lock-in amplifier whereby a circular dichroism spectra is obtained that is free from linear birefringent interference.

14. A method for obtaining the circular dichroism spectra of a substance as claimed in claim 13 in which a second polarizer is added to the optical configuration.

15. A circular polarization spectrometer comprising, in combination:

a light source;

a wavelength selection device;

a first polarizer;

a plurality of polarization modulators vibrating at selected frequencies whereby the strength of each polarization modulator can be manipulated to minimize unwanted background interference;

a sample chamber;

a light detector;

a plurality of lock-in amplifiers whereby each polarization modulator may have a corresponding lock-in amplifier and the signal corresponding to each lock-in amplifier can be isolated;

an electronic manipulator to combine the signals from the plurality of lock-in amplifiers whereby the signals can be combined by mathematical operations.

16. A circular polarization spectrometer as claimed in claim 15 wherein a second polarizer is added to the spectrometer.

* * * * *